No. 694,902. Patented Mar. 4, 1902.
T. B. WILCOX.
GAS IGNITER.
(Application filed Aug. 2, 1901.)
(No Model.)
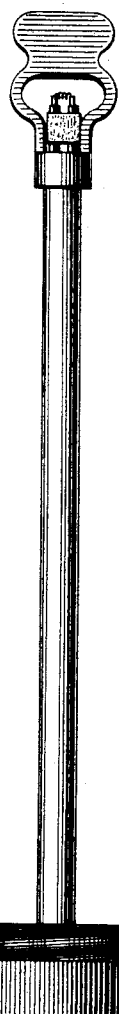
Fig. 1.
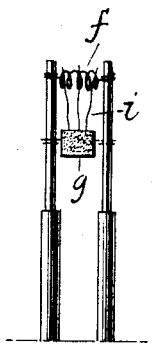
Fig. 3.
Fig. 4.
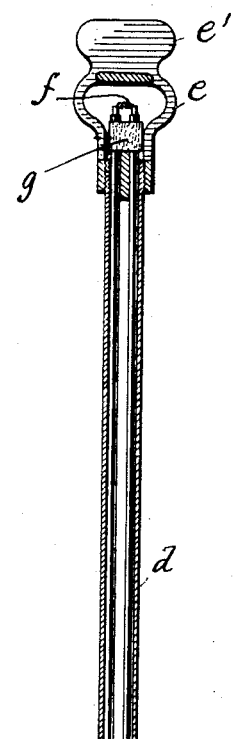
Fig. 2.
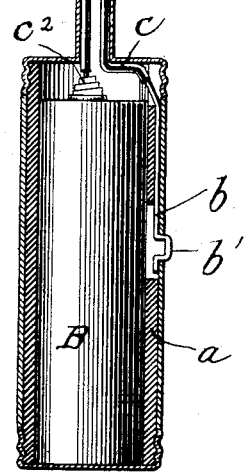
WITNESSES:
INVENTOR
Theodore B Wilcox
BY
Wm A Rosenbaum
ATTORNEY

UNITED STATES PATENT OFFICE.

THEODORE B. WILCOX, OF NEWARK, NEW JERSEY, ASSIGNOR, BY MESNE ASSIGNMENTS, TO ALADDIN MANUFACTURING COMPANY, A CORPORATION OF DELAWARE.

GAS-IGNITER.

SPECIFICATION forming part of Letters Patent No. 694,902, dated March 4, 1902.

Application filed August 2, 1901. Serial No. 70,601. (No model.)

*To all whom it may concern:*

Be it known that I, THEODORE B. WILCOX, a citizen of the United States, residing at Newark, in the county of Essex and State of New Jersey, have invented certain new and useful Improvements in Gas-Igniters, of which the following is a full, clear, and exact description.

This invention relates to gas-lighters and is a combination of electric lighter and automatic lighter of that class in which a chemical pill becomes heated up when subjected to a blast of gas.

The object of the invention is to utilize the functions of the chemical lighter to aid a battery in bringing a wire in incandescence for igniting the gas, thereby rendering it possible to use a small battery or a larger one when it is nearly exhausted. The chemical (platinum-black) is used in small quantity and is distributed throughout a porous body, such as asbestos, which preserves it and renders it unnecessary to renew, except after a long period of use.

In the accompanying drawings, Figure 1 is a side elevation of a complete lighter. Fig. 2 is a section thereof. Fig. 3 is a detail of the igniting devices, and Fig. 4 illustrates the shape of the platinum resistance-strip.

Referring to the drawings by letter, A is a handle consisting of a hollow cylinder adapted to contain a battery-cell B. This battery is preferably of the dry type, the containing vessel being of zinc and constituting the positive pole of the battery, while the negative or carbon pole projects from the center of one head of the cell. The casing A comprises a layer $a$ of insulating material, such as paper, in which is embedded a metal spring $b$, the free end of which is bent to form a push-button $b'$, projecting through the exterior of the casing and occupying a free space or opening in the layer $a$, so that it may be pressed by the thumb into contact with the zinc casing of the battery-cell. One of the conducting-wires of the circuit is indicated by $c$ and the other by $c'$. The former is connected with the spring $b$, while the latter at its extremity is attached to a spiral spring $c^2$, against which the head of the negative element presses when the cell is inserted in the casing. The spring $b$ therefore becomes a circuit-closer for the battery. To the upper end of the handle is attached a tube $d$, carrying at its extremity a cage $e$, the outer end of which supports the usual pair of wings $e'$ for engaging with the key of the gas-cock to turn the gas on and off. The conductors $c$ and $c'$ terminate side by side in the middle of the cage and are electrically connected across their extremities by a strip of platinum foil $f$, which may be coiled or straight, as desired. Special stress is laid upon the use of platinum foil instead of platinum wire, because foil heats more rapidly in flowing gas. The strip is formed by cutting it from a sheet of platinum foil and appears substantially as shown in Fig. 4. Platinum foil has not, so far as I have observed, been used for this purpose.

Adjacent to the conductor $f$ and preferably supported between and by the two stiff conductors $c$ $c'$ is a wad of asbestos or other porous refractory material $g$. This material is partially saturated with particles of platinum-black, the material of which the "igniting-pills" are commonly made. The quantity of this material may be comparatively small, possibly much less than is used in the ordinary pill, the idea being that the wad of asbestos shall act as a vehicle to support an indefinite quantity of the material, which will when heated by the gas communicate its heat by radiation and conduction to the electrical conductor $f$, and thus aid the battery in bringing the latter to incandescence.

The apparatus is used by thrusting the cage into the flowing gas and then pressing the button $b'$. If the battery is fresh, the current will be sufficient to bring the conductor $f$ to incandescence at once and ignite the gas; but if the battery is so exhausted that it cannot bring the conductor $f$ to incandescence the heat developed in the asbestos wad by the flowing gas will be communicated to the conductor $f$ and acting in conjunction with the electrical current will bring the latter to incandescence and ignite the gas. The resistance-conductor $f$ and the "pill" will act reciprocally in heating—that is to say, such heat as may be generated in either device will act upon the other to raise its temperature and so hasten the ignition of the gas.

It is therefore evident that with a comparatively weak battery and a comparatively poor pill structure a serviceable lighter is obtained. A pill constructed in this way will last an indefinite period and the useful life of a battery will be greatly extended by the aid of this pill.

The form shown in Fig. 3 includes additional wires $i$, connecting the wad $g$ with the resistance $f$ to quicken the communication of heat between these two devices.

Having described my invention, I claim—

1. In a gas-igniter, the combination of an incandescing electrical conductor and a pill adapted to be heated by the flowing gas, mounted in juxtaposition to each other, for the purpose set forth.

2. In a gas-lighter, the combination of a source of electricity, a circuit-closer therefor, a resistance-conductor in circuit therewith and a pill adapted to become heated in the presence of flowing gas, said pill and resistance-conductor being located adjacent to each other for the purpose set forth.

3. In a gas-lighting apparatus, the combination of an electrical resistance and a pill adapted to become heated in the presence of flowing gas, said resistance and pill being located within heating distance of each other.

4. A gas-igniter consisting of platinum foil adapted to be thrust into flowing gas, in combination with means for raising the temperature of the foil.

5. A gas-igniter consisting of platinum foil, in combination with means for passing a current of electricity through the foil.

6. The combination of a battery-casing of insulating material, a battery-cell therein having a conducting-casing, a spring circuit-closer embedded in the battery-casing and projecting outside thereof, and adapted to be forced into contact with the battery-cell, and a gas-igniter operated by said circuit-closer.

In witness whereof I subscribe my signature in presence of two witnesses.

THEODORE B. WILCOX.

Witnesses:
WALDO M. CHAPIN,
FRANK S. OBER.